United States Patent [19]

Bones

[11] 4,074,026
[45] Feb. 14, 1978

[54] SEALING OF ELECTROCHEMICAL DEVICES UTILIZING LIQUID SODIUM AND A SOLID CERAMIC ELECTROLYTE PERMEABLE TO SODIUM IONS

[75] Inventor: Roger John Bones, Abingdon, England

[73] Assignee: Chloride Silent Power Limited, London, England

[21] Appl. No.: 765,714

[22] Filed: Feb. 4, 1977

[30] Foreign Application Priority Data

Feb. 9, 1976   United Kingdom ................. 5030/76

[51] Int. Cl.$^2$ .......................................... H01M 10/38
[52] U.S. Cl. ................................... 429/104; 429/185
[58] Field of Search ............... 429/104, 163, 174, 185, 429/191, 30, 31; 65/59, 36, 42, 43

[56] References Cited

U.S. PATENT DOCUMENTS

| | | | |
|---|---|---|---|
| 3,421,945 | 1/1969 | Michalko | 429/174 |
| 3,441,446 | 4/1969 | Heredy | 429/103 X |
| 3,468,709 | 9/1969 | Kummer | 429/104 |
| 3,756,856 | 9/1973 | Tennenhouse | 429/174 X |
| 3,946,751 | 3/1976 | Breiter et al. | 429/218 X |
| 3,982,959 | 9/1976 | Partridge et al. | 429/163 |

*Primary Examiner*—Anthony Skapars
*Attorney, Agent, or Firm*—Beveridge, DeGrandi, Kline & Lunsford

[57] ABSTRACT

In an electrochemical cell, such as a sodium sulphur cell, having a solid ceramic sodium-ion permeable electrolyte forming part of the boundary of a sodium-containing region, to seal this region, the ceramic electrolyte or a ceramic extension thereof is sealed to a metal housing or metal closure element using glass with the glass-to-metal interface protected against the effect of sodium vapour by a niobium coating over the metal in the region where the interface is exposed to the sodium or this interface is protected from such exposure by niobium foil.

13 Claims, 7 Drawing Figures

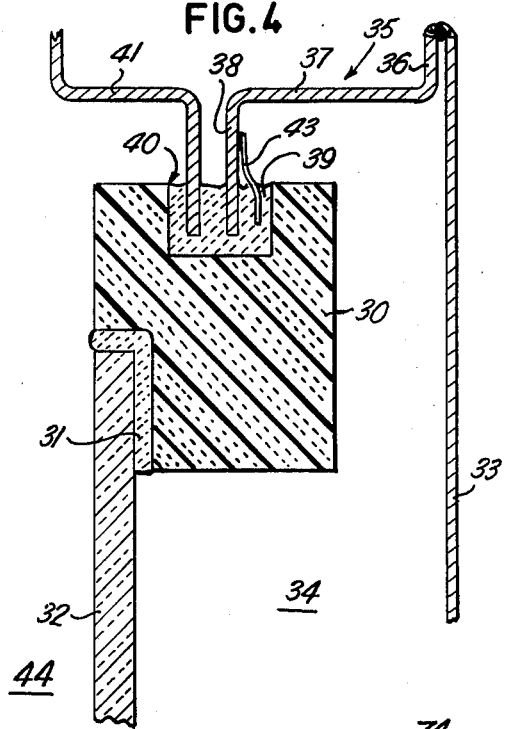
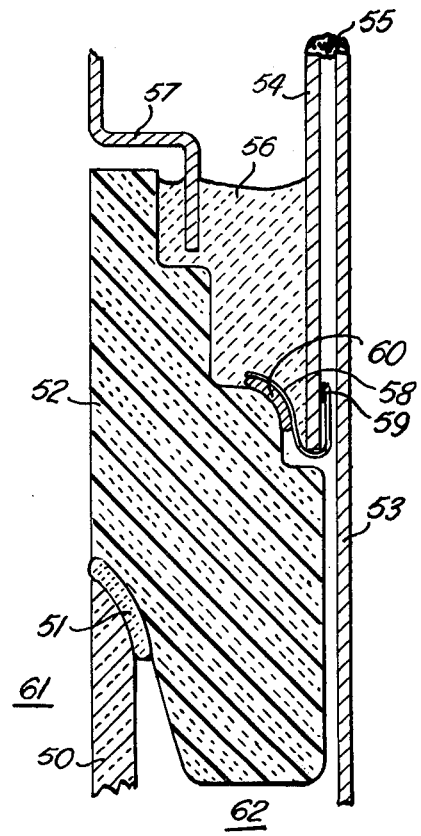
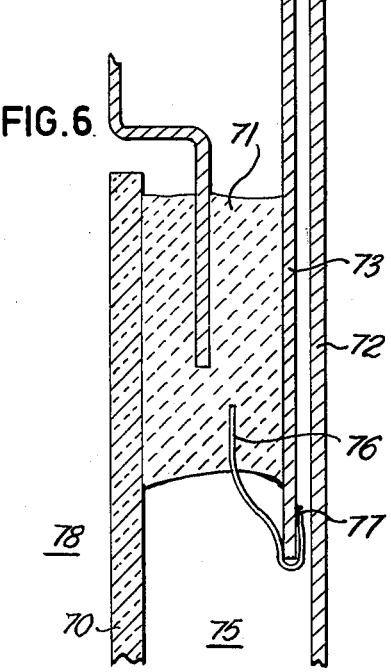
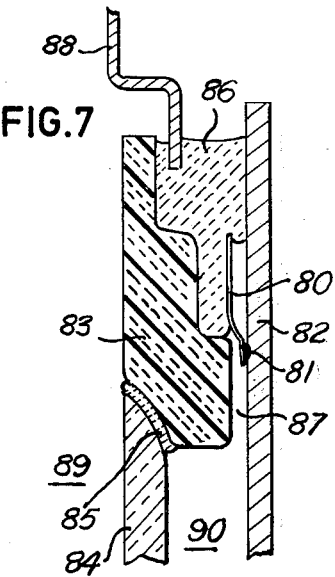

SEALING OF ELECTROCHEMICAL DEVICES UTILIZING LIQUID SODIUM AND A SOLID CERAMIC ELECTROLYTE PERMEABLE TO SODIUM IONS

BACKGROUND OF THE INVENTION

1. Field of the Invention

This invention relates to the sealing of a sodium-containing region in an electrochemical device, such as a cell utilising liquid sodium and solid electrolyte permeable to sodium ions. The invention has particular application to electrochemical cells, such as for example sodium sulphur cells, making use of sodium as one of the electrode materials.

2. Prior Art

A sodium sulphur cell contains liquid sodium separated by a sodium-ion permeable solid electrolyte, usually beta-alumina, from a cathodic reactant comprising liquid sulphur and sodium polysulphides. The sodium and the cathodic reactant are highly reactive materials and it is essential that the cell should be properly sealed to prevent any escape of these materials. Various types of seals have been proposed heretofore. Mechanical hermetic seals are disclosed for example in U.S. Pat. Nos. 3,946,751 and 3,959,013.

The present invention is concerned more particularly with glass seals. The use of glass seals is described, for example in U.S. Pat. Nos. 3,928,071, 3,826,685 and 3,868,273. It is convenient, in sodium sulphur cells and similar electrochemical cells to use a glass as a bonding agent between a ceramic material and a metal member. In a sodium sulphur cell, the closure may be effected by sealing the ceramic electrolyte material to a closure member or to the housing. It is well-known however to put an alpha-alumina extension onto a beta-alumina ceramic tube to have a non-conductive end portion of the tube. This may readily be done with a glass seal. The alpha-alumina extension then has to be sealed to the housing or to the closure member. The closure member may be a part of a current collector. Thus glass may be employed, in sealing a cell, as a bond between solid electrolyte material, e.g. beta-alumina ceramic, or an insulating ceramic, e.g. alpha-alumina, and a metal component or components such as a current collector, an intermediate component, or an external housing. The glass-to-metal bond is formed by a reaction between the glass and an oxide layer on the metal. The glass employed is a sodium-resistant glass, such as an aluminate or alumino-borate glass. The metal material has to be chosen in accordance with both mechanical and chemical requirements. In particular, it must resist attack by sodium at elevated temperatures. It is the practice in sodium sulphur cells to use mild steel or stainless steel for the housing, in contact with the sodium.

The glass-to-steel bond formed is an oxide bond and applicant has found that the oxide material of the bond is reduced leading to bond weakening and eventually seal failure, when this bond is exposed to sodium vapour. The problem arises very particularly at the elevated temperatures employed in electrochemical cells using liquid sodium which may typically operate at temperatures of 350° to 400° C. Although techniques have been devised for sealing metal direct to ceramic material so as to avoid the use of glass, there are substantial advantages in the employment of glass as a bonding agent in electrochemical cells of the kind described above. The present invention is directed to preventing or minimising glass-to-metal bond weakening in the presence of sodium vapour.

BRIEF SUMMARY OF THE INVENTION

According to the present invention, in an electrochemical device having a sodium-containing region partially bounded by a sodium-ion permeable solid electrolyte element and having the sodium-containing region sealed by a sodium-resistant glass seal joining the ceramic electrolyte or a ceramic extension thereof to a metal member the surface of the metal member, at least in the region of the periphery of the glass-metal interface subjected to exposure of the sodium, is coated with a protective layer of niobium or a film of niobium is secured to the metal member in the region thereof exposed to the sodium, which film extends into said glass-metal interface. Niobium is a protective metal as its oxide is stable against reduction by sodium liquid or vapour. Applicant has found that niobium, arranged as described above, gives satisfactory protection to a glass-to-metal seal in a sodium sulphur cell. Niobium will give long-term protection, unlike titanium or zirconium which might be thought suitable but which give only limited protection. It will be seen that the protective metal coating or film gives protection to said metal member in the region where the metal-glass interface would, in the absence of the protective metal, be exposed to the sodium vapour. The presence of the protective metal, due to the stability of its oxide, gives a high degree of protection against weakening of the bond to the glass. The glass must be a sodium-resistant glass. In this way protection can be obtained for the glass-metal bond subjected to sodium vapour. This glass-to-metal seal may be employed in making a seal to a metal member of mild steel or stainless steel or corrosion-resistant nickel alloy such as nickel iron alloy.

In a sodium sulphur cell, the seal must be able to withstand temperature cycling and, using a seal as described above, the metal member should have a coefficient of thermal expansion similar to that of glass and the ceramic, e.g. beta-alumina or alpha-alumina. If the cell housing is made of a metal having a suitable coefficient of expansion, referred to hereinafter as a controlled expansion metal, then a niobium coating could be put on the appropriate part of the metal housing where the seal is to be formed. More generally, however, the cell housing has to be made of a metal such as mild steel or stainless steel which has a coefficient of expansion greater than that of the glass, alumina and niobium. In this case, it is preferred to use an intermediate metal member of a suitable coefficient of expansion, referred to hereinafter as a controlled expansion alloy. The material must be chemically compatible with the materials with which it is in contact; a number of nickel alloys, such as nickel-iron corrosion-resistant alloys, e.g. Nilo 42 or Nilo K, are suitable. Nilo 42 is a binary nickel-iron alloy containing about 42% by weight of nickel. Nilo K is a nickel-cobalt-iron alloy containing about 29.5% by weight of nickel and about 17% by weight of cobalt.

The invention furthermore includes within its scope a sodium sulphur cell having a solid sodium-ion permeable electrolyte separating a sodium compartment from a cathodic reactant compartment wherein the sodium compartment is at least partially bounded by a metal housing and is sealed by sealing means between the electrolyte and the housing which sealing means include glass as a bonding agent between the ceramic electrolyte element or a ceramic extension thereof and said metal housing or an intermediate metal member attached to the housing and wherein a protective niobium coating or foil is provided over the metal to protect the metal-glass interface at least in the region where it is exposed to sodium from the sodium compartment.

In particular, if a protective coating is employed, it may be preferable to apply this coating to a base metal member having a coefficient of expansion similar to that of coating material, which base metal member is then secured in the housing before the latter is sealed.

The electrolyte in a sodium sulphur cell is conveniently of tubular form and, as previously mentioned, an alpha-alumina extension, e.g. a flange may be secured to the beta-alumina tube, using for example a glass seal; this alpha-alumina flange may then be sealed to a cylindrical housing with the glass-metal seal. Conveniently in such a cell the sodium compartment is an annular region around the outside of the beta-alumina tube, and in this case, if the housing has a suitable coefficient of expansion, a niobium coating may be provided on the housing in the region of the seal to the alpha-alumina flange. Preferably however the niobium coating is provided on a base member, such as a corrosion-resistant nickel alloy, which has a coefficient of thermal expansion similar to that of the glass, alpha-alumina and niobium. A suitable base metal is a nickel-iron alloy such as that known as the aforementioned and described Nilo 42 or Nilo K. In one convenient form of construction having an outer cylindrical steel housing, a nickel-iron corrosion-resistant ring is welded to the open end of the housing to extend downwardly therein, this ring being coated with niobium at least in the region of the ring where the glass-to-metal interface is exposed to sodium.

A coating of niobium may be applied to such a base metal member by any convenient technique such as for example electro-plating or vapour deposition. The coating may be quite thin and a typical thickness might be of the order of 10 to 200 microns.

Instead of coating the ring with niobium, it may be more convenient to secure niobium foil to the ring, for example by electron beam welding along one edge of the foil, the foil being secured to the ring in a part thereof which is exposed to the sodium and the foil extending around the surface of the ring, conveniently close thereto, so as to extend into the glass and thereby cover the surface of the ring at the region of the glass-metal interface which is exposed to the sodium.

In another form of seal used in sodium sulphur cells where an annular alpha-alumina flange is secured to the open end of a beta-alumina electrolyte tube, an annular groove is formed in the alpha-alumina flange and a metal member, conveniently a controlled expansion nickel-iron alloy, is provided which is secured, for example by welding, to the end of a cylindrical steel housing, which controlled expansion metal member extends into the aforementioned annular groove and is secured by glass in that groove, this metal member, where it extends into the groove, being protected by niobium plating or by niobium foil as described above.

BRIEF DESCRIPTION OF THE DRAWINGS

FIGS. 1 to 7 each show a form of seal between a beta-alumina tube and an outer metal housing for use in a sodium sulphur cell.

DESCRIPTION OF THE PREFERRED EMBODIMENTS

Figure 1:
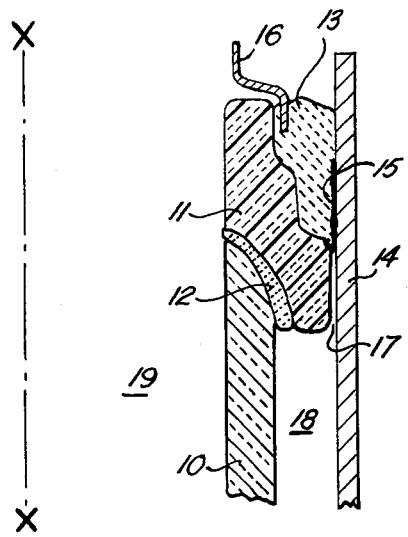

Referring to FIG. 1 there is shown diagrammatically part of a beta-alumina tube 10 in a sodium sulphur cell, the axis of the tube being indicated by the chain line X—X. The tube 10 is closed at its lower end and forms the container for the sulphur/polysulphides forming the cathodic reactant for the cell. Secured to the open end of this tube is an alpha-alumina flange 11 which is sealed to the beta-alumina tube 10 by a glass seal 12. The glass seal is formed, in this embodiment and in all the further embodiments described below, of a sodium-resistant glass such as an aluminate or alumino-borate glass. In the arrangement of FIG. 1, the sub-assembly is secured by glass 13 in an outer tubular housing 14 of a controlled expansion metal, e.g. Nilo 42, which, on its inner surface in the region of the seal, is coated with niobium, as shown at 15. A nickeliron corrosion-resistant ring 16 of controlled expansion material, as hereinbefore defined, is also secured in the seal assembly to provide a support for the cathode current collector and a closure for the cathodic compartment. The niobium coating 15 extends between the glass 13 and the housing 14 so protecting the glass-metal bond at the interface exposed to sodium vapour. It will be appreciated that, unless the alpha-alumina flange 11 is ground, a dimensional tolerance has to be allowed resulting in a gap 17 between the housing 14 and the flange 11. In this cell, the region 18 between the beta-alumina electrolyte tube and the outer housing 14 contains liquid sodium and sodium vapour at its upper end whilst the region 19 inside the beta-alumina tube contains the aforementioned cathodic reactant and also a cathodic current collector (not shown). Sodium vapour will penetrate through the gap 17 between the alpha-alumina flange 11 and the outer housing 14. The flange 11 is sealed to the housing 14 by the glass 13 to form a glassed-in compression joint, the metal-to-glass bond being protected by the niobium 15.

Figure 2:
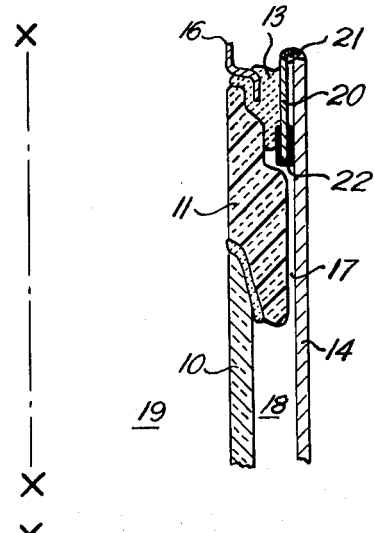

In FIG. 2, which shows a modified form of construction, the same reference characters are used as in FIG. 1 to indicate corresponding features. In FIG. 2, the housing 14 is formed of steel and a corrosion-resistant nickel-iron alloy ring 20 forming a controlled expansion member as previously defined is secured in the top of the housing 14, conveniently by welding around adjacent top edges of the housing 14 and ring 20 as shown at 21. As in FIG. 1, a controlled expansion nickel-iron annular member 16 is also secured in the seal assembly to provide a support for the cathode current collector and a closure for the cathodic compartment. The present invention is concerned primarily with the protection of the metal-to-glass bond in the presence of sodium vapour and, to give this protection, at least the lower inner surface of the ring 20 is plated with niobium, this plating extending, as shown at 22, at least over the part of the ring 20 where the glass-to-metal interface is exposed to the sodium vapour.

Figure 3:
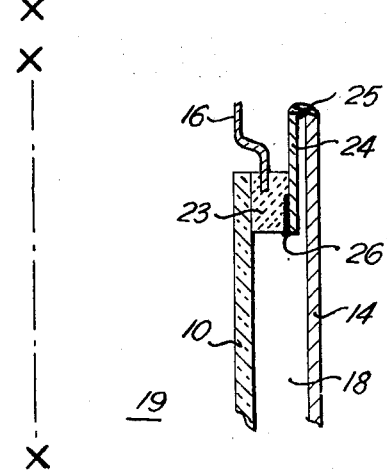

FIG. 3 shows a modification of the construction of FIG. 2 having, as before, a beta-alumina electrolyte tube 10 sealed to a cylindrical steel casing 14. In the arrangement of FIG. 2, no alpha-alumina flange is provided, the sealing being effected directly by glass 23. To protect the glass-to-metal bond, a controlled expansion nickel-iron ring 24 is secured inside the end of the housing tube, conveniently by welding around the top edge thereof as shown at 25 and this ring 24 is plated with niobium at least around the lower part thereof, as shown at 26, where the glass-to-metal interface is exposed to sodium vapour from the sodium compartment 18.

In the construction shown in FIG. 4, an alpha-alumina flange 30 is secured by glass 31 to the top end of a beta-alumina electrolyte tube 32. This assembly is contained within an outer steel cylindrical casing 33, the region 34 between the electrolyte tube and the housing containing sodium and sodium vapour. In the arrangement shown in FIG. 4 sealing of the sodium compartment is effected by means of a controlled expansion nickel-iron annular member 35 which is welded at its top end to the top of the casing 33. This member 35 is of generally annular form and has a downwardly-extending cylindrical portion 36 lying adjacent the inner surface of the steel housing, and inwardly-extending portion 37 and a further downwardly-extending portion 38 which extends into glass 39 in an annular groove 40 formed in the alpha-alumina flange 30. Also dipping into the glass in this groove is a further controlled expansion nickel-iron member 41 forming a support for a cathode current collector (not shown) and part of a seal for the cathodic region of the cell. To protect the metal-to-glass interface where it is exposed to the sodium vapour, niobium foil 43 is welded, for example by electron beam welding, to the aforementioned downwardly-extending portion 38, the foil extending completely around this member on the outer face thereof and extending downwardly into the glass 39 so as to prevent sodium vapour reaching the interface between the glass and the downwardly-extending member. The electrolyte tube, as in the previously-described embodiments, is closed at its lower end and thus separates the cathodic reactant-containing region 44 within the tube from the sodium-containing region 34 in the annular space between the housing 33 and the electrolyte tube 32.

FIG. 5 illustrates yet another construction of seal for a sodium sulphur cell. In FIG. 5 is shown part of a beta-alumina tube 50 sealed by glass 51 to an alpha-alumina flange 52 and contained within an outer steel casing 53. A controlled expansion nickel-iron ring 54 is secured by welding, as shown at 55, to the upper edge of the housing so as to extend downwardly within the housing. The upper face of the alpha-alumina flange 52 is shaped to leave a channel which is filled with glass 56. A cathode current collector support member 57 is also secured in this groove by the glass. This support member forms a closure for the top of tube 50. To protect the bond between the ring 54 and the glass from the sodium vapour, niobium foil 58 is secured by electron beam welding as shown at 59 with the weld extending completely around the ring 54, this connection being effected in the annular space between the ring 54 and the casing 53. The foil, in the embodiment illustrated, extends downwardly under the lower end of the ring and then upwardly into the glass as shown at 60 so as to prevent sodium vapour reaching the interface between the glass and the ring 55. The foil might alternatively be secured on the bottom edge of the member 54 or around the inner surface near the bottom edge of member 54. In each case it will prevent sodium vapour reaching the interface between the ring 54 and the glass. The beta-alumina tube 50 contains the cathodic reactant in the region 61 inside the tube, the sodium being in the annular region 62 between the electrolyte tube 50 and housing 53.

FIG. 6 shows yet another embodiment of the invention having a beta-alumina tube 70 which is secured by glass 71 within a cylindrical steel casing 72. As in the previous example, a controlled expansion nickel-iron alloy ring 73 is provided within the top of the tube and secured thereto by welding 74, this ring extending downwardly into the sodium compartment 75 below the level of the glass. Niobium foil 76 is secured by welding 77 to this ring 73 on the outer surface thereof and extends around the bottom thereof and upwardly into the glass 71 to protect the interface between the glass 71 and the ring 73 from exposure to sodium vapour. As in the previous embodiments, the tube 70 is closed at its lower end and contains the cathodic reactant in the region 78 inside the tube. A current collector support member 79 extends into the glass 71 and forms a top closure for the cathodic reactant region 78.

FIG. 7 illustrates yet another embodiment of the invention in which an annular foil element 80 of niobium is secured at 81 to a cylindrical casing 82 of controlled-expansion nickel-iron alloy and extends upwardly between an alpha-alumina flange 83 and the casing. The flange 83 is secured to a beta-alumina electrolyte tube 84 by glass as shown at 85 and further glass 86 seals the flange 83 to the casing 82, the niobium foil 80 protecting the metal-to-glass joint from sodium vapour in the gap 87 between the flange 83 and the casing 82. A current collector support member 88 of nickel-iron, forms also a top closure for the cathodic reactant region 89 within the tube 84, this tube separating the cathodic reactant from sodium in the annular region 90 between the electrolyte tube 84 and outer casing 82.

Although in the above-described embodiments, the cell has been described with an upright electrolyte tube sealed at its upper end, such cells may be used horizontally so that liquid sodium would be in contact with part of the glass seal. The protection extends around the whole of the interface exposed to sodium liquid or vapour.

I claim:

1. In an electrochemical device having a sodium-containing region partially bounded by a sodium-ion permeable solid ceramic electrolyte element and having the sodium-containing region sealed by a sodium-resistant glass seal joining the ceramic electrolyte element or a ceramic extension thereof to a metal member, the improvement which comprises providing a protective layer of film of niobium secured to said metal member in the region thereof exposed to the sodium in said sodium-containing region, and extending into said glass seal to protect at least the periphery of the interface between said glass seal and said metal member which is subjected to exposure to the sodium.

2. In an electrochemical device as claimed in claim 1 having also a steel housing partially bounding said sodium-containing region, the improvement which comprises providing said metal member as an intermediate metal member between said housing and said glass seal, said intermediate metal member being formed of a nickel alloy having a coefficient of thermal expansion similar to that of said glass and said ceramic electrolyte element.

3. In an electrochemical device as claimed in claim 2, the improvement which comprises forming said intermediate member of a nickel-iron corrosion-resistant alloy.

4. In an electrochemical device as claimed in claim 3, the improvement wherein said nickel-iron alloy in Nilo 42 or Nilo K.

5. In an electrochemical cell having a sodium-containing region partially bounded by a sodium-ion permeable solid ceramic electrolyte element and having the sodium-containing region sealed by a sodium-resistant glass seal joining the ceramic electrolyte element or a ceramic extension thereof to a metal member, the improvement which comprises providing a coating of niobium over the surface of said metal member at least in the region of the periphery of the interface between said glass seal and said metal member which is subjected to exposure to sodium to prevent sodium vapour reaching any region of direct contact between said glass seal and said metal member.

6. In an electrochemical cell having a sodium-containing region partially bounded by a sodium-ion permeable solid ceramic electrolyte element and having the sodium-containing region sealed by a sodium-resistant glass seal joining the ceramic electrolyte element or a ceramic extension thereof to a metal member, the improvement which comprises providing a film of niobium secured to said metal member in the region thereof exposed to the sodium in said sodium containing region, said film extending into said glass seal to form a sealed region within said sodium-containing region, said sealed region including the periphery of the interface between said glass seal and said metal member to protect said periphery from exposure to said sodium.

7. A sodium sulphur cell having a solid sodium-ion permeable ceramic electrolyte element separating a sodium compartment from a cathodic reactant compartment wherein the sodium compartment is at least partially bounded by a metal housing and is sealed by sealing means between the electrolyte and the housing, said sealing means including glass as a bonding agent between the ceramic electrolyte element or a ceramic extension thereof and said metal housing or an intermediate metal member attached to said housing and wherein a protective niobium coating or foil is provided over the metal to protect the interface between said glass and said metal housing or intermediate metal member at least in the region where said interface is exposed to sodium from the sodium compartment.

8. A sodium cell as claimed in claim 7 wherein said protective metal coating is provided over a base metal member having a coefficient of expansion similar to that of said coating material, said base metal member being secured in said metal housing.

9. A sodium sulphur cell as claimed in claim 7 wherein the electrolyte is a beta-alumina tube with an alpha-alumina flange secured to the beta-alumina tube and wherein said alpha-alumina flange is sealed to a cylindrical housing by said sealing means.

10. A sodium sulphur cell as claimed in claim 7 wherein the sodium compartment is an annular region around the outside of the beta-alumina tube within an outer cylindrical steel housing and wherein a nickel-iron corrosion-resistant ring welded to the open end of the housing and extending downwardly therein, has a coating of niobium at least in the region of the ring where the interface between said ring and said glass is exposed to sodium.

11. A sodium sulphur cell as claimed in claim 10 wherein said coating is a niobium coating of 10 to 200 microns thickness.

12. A sodium sulphur cell as claimed in claim 7 wherein the sodium compartment is an annular region around the outside of the beta-alumina tube within an outer cylindrical steel housing and wherein a nickel-iron corrosion-resistant ring welded to the open end of the housing and extending downwardly therein has niobium foil secured along one edge of the foil to the ring in a part thereof which is exposed to the sodium, the foil extending around the surface of the ring, so as to extend into the glass and thereby cover the surface of the ring at the region of the interface between said ring and said glass which is exposed to the sodium.

13. A sodium sulphur cell as claimed in claim 7 wherein an annular alpha-alumina flange is secured to the open end of a beta-alumina electrolyte tube, said alpha-alumina flange having an annular groove therein, and wherein a metal member is provided which is secured to the end of a cylindrical steel housing for the cell, said metal member extending into said annular groove and being secured by glass in that groove, said metal member, where it extends into the groove, being protected by said niobium plating or niobium foil.

* * * * *